No. 732,250. PATENTED JUNE 30, 1903.
E. WUERFEL.
REGULATOR FOR WINDMILLS.
APPLICATION FILED APR. 19, 1900.
NO MODEL. 3 SHEETS—SHEET 1.

WITNESSES: INVENTOR.
F. B. Townsend Ernest Wuerfel
H. W. Munday BY Munday, Evarts & Adcock
 ATTORNEYS.

No. 732,250. PATENTED JUNE 30, 1903.
E. WUERFEL.
REGULATOR FOR WINDMILLS.
APPLICATION FILED APR. 19, 1900.
NO MODEL. 3 SHEETS—SHEET 2.
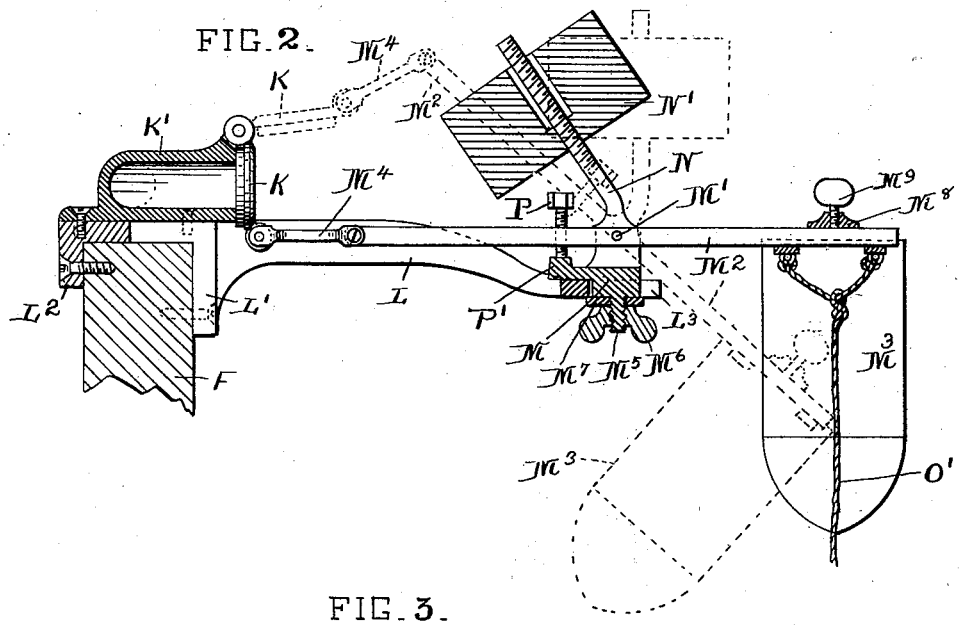
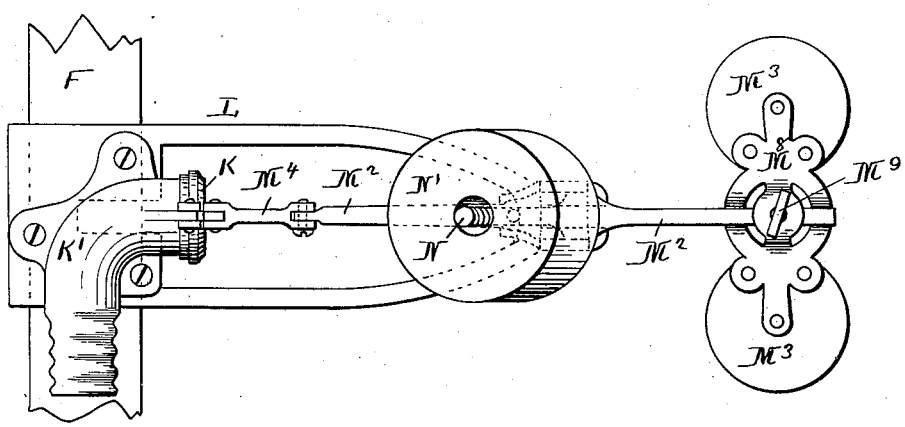
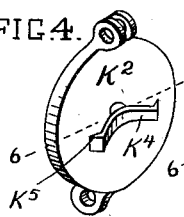 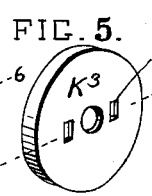 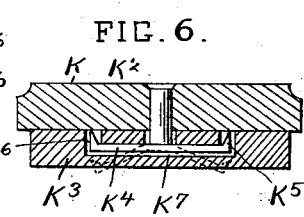 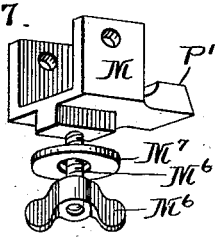
WITNESSES:
F. B. Townsend
A. W. Munday
INVENTOR.
Ernest Wuerfel
BY Munday, Evarts & Adcock
His ATTORNEYS.

No. 732,250. PATENTED JUNE 30, 1903.
E. WUERFEL.
REGULATOR FOR WINDMILLS.
APPLICATION FILED APR. 19, 1900.
NO MODEL. 3 SHEETS—SHEET 3.

WITNESSES:
F. B. Townsend
H. W. Munday

INVENTOR.
Ernest Wuerfel
BY
Munday, Evarts & Adcock
His ATTORNEYS.

No. 732,250. Patented June 30, 1903.

UNITED STATES PATENT OFFICE.

ERNEST WUERFEL, OF CHICAGO, ILLINOIS.

REGULATOR FOR WINDMILLS.

SPECIFICATION forming part of Letters Patent No. 732,250, dated June 30, 1903.

Application filed April 19, 1900. Serial No. 13,440. (No model.)

*To all whom it may concern:*

Be it known that I, ERNEST WUERFEL, a citizen of the United States, residing in Chicago, in the county of Cook and State of Illinois, have invented a new and useful Improvement in Regulators for Windmills, of which the following is a specification.

The object of this invention is to provide windmills with improved means whereby they may be put out of action when a sufficient amount of water has been pumped and is present in the tank or trough and thrown into action again when the water in the tank or trough has fallen to a predetermined level. The invention consists in the construction of the regulating means hereinafter set forth.

Figure 1:
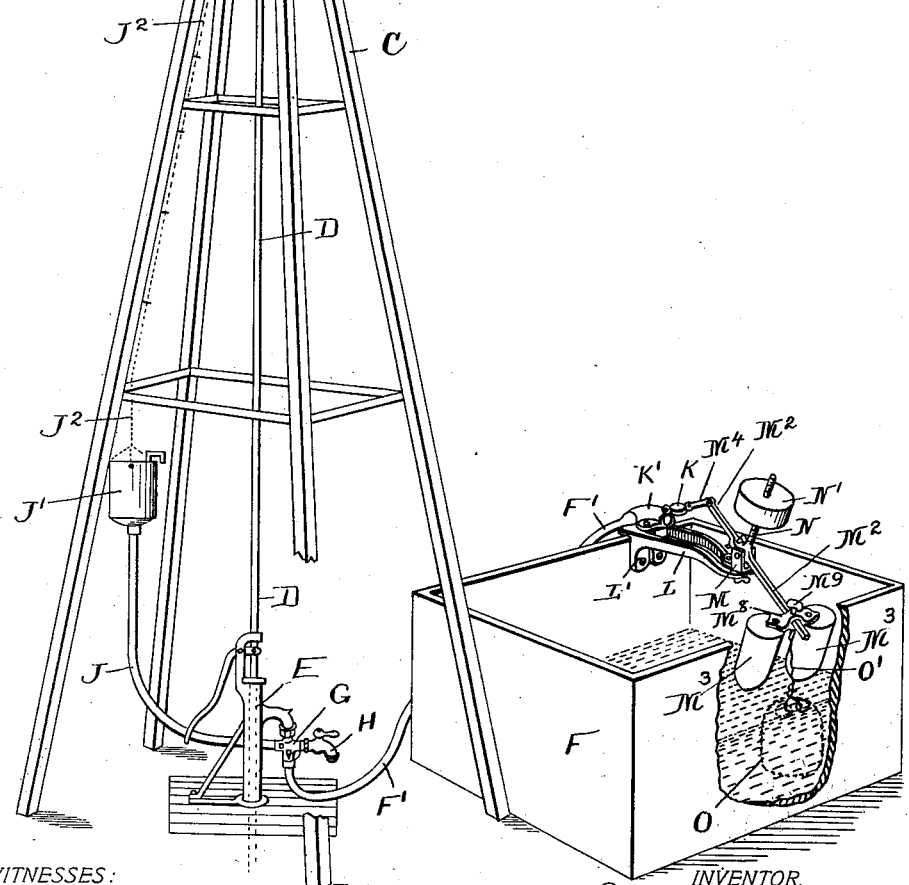
Figure 8:
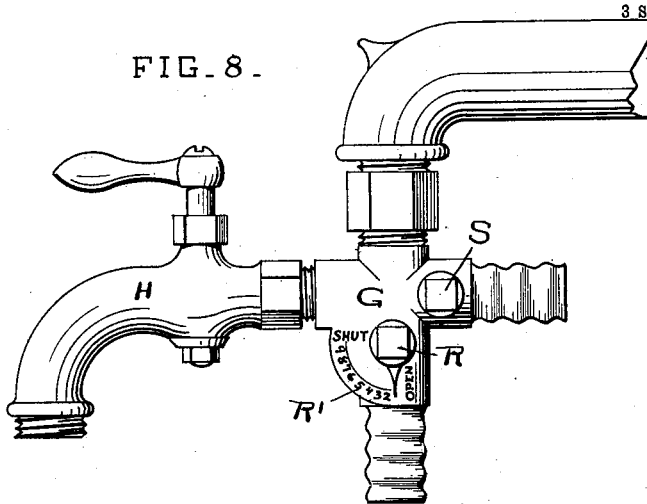
Figure 9:
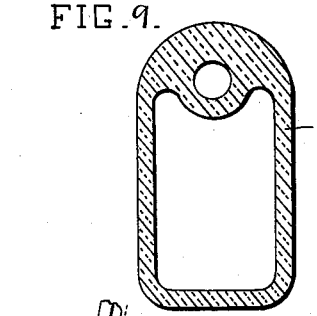
Figure 10:
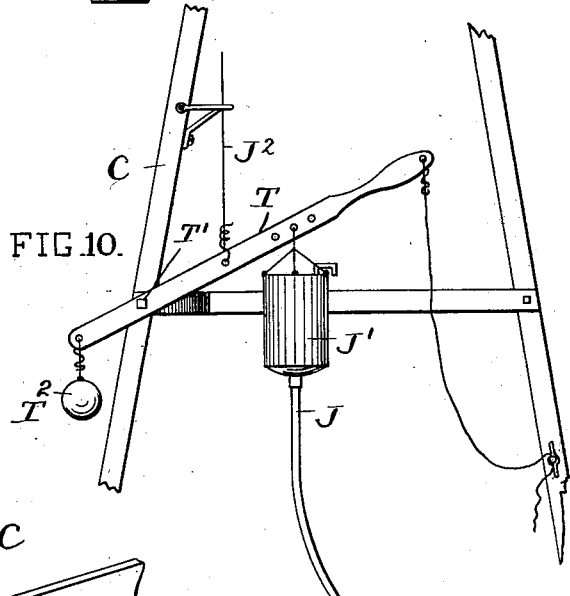
Figure 11:
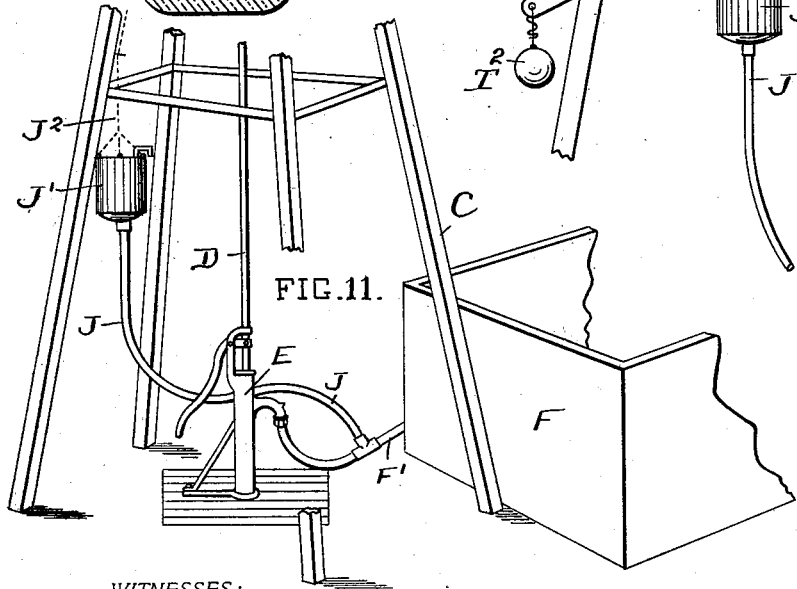

In the accompanying drawings I show at Figure 1 a perspective of a windmill provided with my invention. Fig. 2 is a detail section of a part of the apparatus, and Fig. 3 is a plan of the same parts. Figs. 4 and 5 are detail views of the water-valve. Fig. 6 is a section of the same valve on the line 6 6 of said Figs. 4 and 5. Fig. 7 is a detail view of the adjustable pivot-block of the closing-weight. Fig. 8 shows the faucet and coupling enlarged. Fig. 9 is a detail section of the sinker, and Figs. 10 and 11 show modifications of the apparatus.

In the drawings, A represents the windmill; B, the rudder; C, the tower; D, the pump-rod, and E the pump, the latter being adapted to be operated by hand when desired. These parts may be of the usual construction.

F is the tank into which the water is pumped, and it is connected to the pump by a pipe F'. To the spout of the pump is attached a four-way connection G, one arm of such connection being attached to the pump, another to the pipe F', another to the faucet H, adapted to be used when filling pails, &c., and the fourth to the pipe J of the mill-controlling means.

Supposing the faucet to be closed, the water first moves into the tank F until the height of water therein is such as to cause the closing of the valve K, located at the outlet of the water-passage formed in a hollow casting K', with which the hose F' connects. The means for closing the valve are the following: Attached to the casting K' are an arm L and flanges L' L², whereby it may be secured to the top of the tank. The projecting end of the arm L is slotted, as shown at L³, and in this is secured a sliding block M, having upstanding ears adapted to receive the pivot M' of a swinging bar M², carrying a float or floats M³ at one end and joined at its other end to the lower or swinging edge of the valve K by a link M⁴. The block is adjustably secured upon the arm or bracket L by the screw M⁵, thumb-nut M⁶, and washer M⁷. An arm N extends from the pivot M' in an angling direction and is rigid with the bar M². This arm is threaded, and a weight N' is secured thereon, the thread permitting all necessary adjustments of the weight. In one position the arm inclines toward the valve, and in its other position it inclines away from the valve. The positions of the parts shown in full lines of Fig. 2 are the positions occupied by them when the tank is full. In this position the valve is locked closed by reason of the horizontal positions of the lever M² and the link.

A sinker O is attached to the lever M², which carries the floats, by a cord or chain O'. It is made heavy enough to sink in the water with a specific gravity somewhat in excess of that of the water, but not so heavy as to prevent its being lifted by the lever when the valve closes. I prefer to construct it in the form of a closed glass cylinder, as shown at Fig. 9. This sinker is let down into the water, but is uncovered by the water when the latter falls to its lower levels, so that its effective weight increases at such times. The increase in the weight of the sinker is sufficient to enable it to overcome the resistance of the weight N' and to swing the parts to the positions given in broken lines at Fig. 2. The tank will now refill with water, and in so doing the floats M³ will cause the closing of the valve and the return of the other parts to the positions given in full lines in said figure. The level of the water in the tank thus operates said valve, and the valve controls the operation of the windmill by means of the following devices: When the valve closes the water pumped by the mill seeks the only outlet then open to it—viz., the pipe J, through which it moves into a receptacle J', the entrance to the receptacle being through a bottom inlet. This receptacle is, by a wire, chain, or cord J², passing en route over pulley J³ to an arm J⁴, attached to a weighted toothed segment J⁵, meshing with a gear J⁶ on a sleeve J⁷, supporting the rudder B. The receptacle J' is adapted when filled with water to cause such tension on the cord J² as will operate the segment J⁵ and throws the mill out of wind. The condition just described continues so long as the receptacle J' remains full of water; but when the water in the tank falls so as to open the valve the water will flow from receptacle J', because that receptacle is placed at a higher level than the tank, and in consequence of this the weighted segment is allowed to resume its position shown at Fig. 1 and thereby the mill is placed in the wind again and resumes pumping.

At P, Fig. 2, is shown a set-screw secured in the bar M². It sits against the projection P' on the adjustable block M, and its office is to prevent the link M⁴ and the end of the bar to which it is joined from moving below a horizontal position. This is important, because if they were allowed to move below the opening of the valve would require much greater power. The weight when inclined toward the valve resists the opening of the latter, and the valve, in fact, remains tightly closed until the sinker, by reason of the fall of the water, attains its maximum power and overcomes the resistance of the weight. When this condition arises, the weight shifts quickly to its other position and the valve opens to its full extent. In like manner the weight when inclined in the other direction resists the closing of the valve until the rising water gives the floats sufficient power to overcome the resistance, and when it is overcome the weight shifts back to its first position and the valve closes as quickly as it opened. I thus avoid all partial opening and closing movements of the valve and also prevent frequent throwing into and out of operation of the mill, which would occur if the valve were permitted to partially open and close. The weight therefore prevents these partial operations of the valve, and when shifted in one direction it also assists the floats in closing and locking the valve and when shifted in the other direction it assists the sinker in opening the valve as well as in holding it open.

The preferred construction of the valve is plainly shown at Figs. 4 and 6, and consists of a disk K², having eyes at its top, whereby the valve may be hinged, and an eye at the bottom, whereby it is joined to the link M⁴, and a rubber disk K³, secured flatwise to the metal disk by a T-shaped retainer K⁴, the stem of which passes through the metal disk and is headed at the back thereof. The arms of the retainer are provided with prongs K⁵ at their ends, adapted to enter openings K⁶ in the rubber disk, and the arms themselves are inclosed in a recess K⁷. When inserted in the rubber disk, the arms are preferably bent into form indicated at Fig. 4 and by broken lines in Fig. 6 and afterward straightened, as in full lines in the latter figure.

It is sometimes desirable to regulate the amount of water which shall pass into the tank, and for this purpose I place a valve R on the branch of the connection G leading to the tank, with an arm and a graduated indicator R', by which the operator may set the valve with exactness. By this means the tank may be made to fill slowly, even if the mill is pumping fast, and consequently at such times excess water will be raised which will force itself up to the receptacle J' and cause the throwing out of the mill. The valve R is adapted to serve as a governing device to the mill. Thus, supposing the mill to be running in the ordinary way and less than its full capacity of water is needed, the valve R is set so as to limit the amount of water which may pass out, thus reducing the capacity of the waterway. If now a wind-storm arises while the mill is in action, the mill will be operated very rapidly and caused to pump more water than can pass the valve, and this excess water backs up into the regulator J' and shuts off the mill, and the mill then remains out of wind until the regulator empties. When this occurs, if the storm still continues excess water will again be pumped and the mill be again thrown out of service, and so on indefinitely. The length of the intervals between the pumpings will depend upon the proportion of the water which is shut off, the greater the proportion the longer the interval, the excess water accumulating more rapidly and the regulator emptying more slowly when the valve cuts off much than when it cuts off a small part of the capacity. The mill is thus governed, it will be seen, independently of the tank-valve. A valve S is also desirably present in the connection G to shut off the water from the regulator. Both it and valve R may be operated by wrenches.

Instead of attaching the receptacle J' directly to the chain or cord J² it may be secured to a lever T, pivoted to the tower at T' and provided with a counterbalance T², the attachment of the cord J² being located between the pivot and the receptacle J' and the counterbalance being located at the farther side of the pivot. In this manner the power of the receptacle may be increased and will be understood from Fig. 10.

In Fig. 11 I show the hose J of the regulator J' connected to the hose F' and the latter attached directly to the spout of the pump, thus obtaining some of the benefits of the invention, while dispensing with the four-way connection, but sacrificing some of the benefits attending the use of the preferred form of the invention.

While I have illustrated the invention as applied to a tank, it will be understood that it may be used with a watering-trough instead of a tank.

The water when it runs from the regulator is not wasted, but empties into the trough; but the water may kept in the regulator for any length of time desired and the mill be thus kept out of wind by closing valve S. Said valve may also be used to prevent the water from entering the regulator, so that the mill may be kept in action regardless of the stage of water in the tank or trough—as, for instance, when drawing water from the faucet for sprinkling lawns or other purposes. Both the valves S and R may be closed when taking water from the faucet, and if the valve R and the faucet are both closed the water will be forced to the regulator and shut down the mill.

At the times when the wind fails and it is necessary to pump by hand the valves S and R are closed and the pump-rod disconnected.

The regulator $J'$ is preferably shaped like an inverted ordinary cone-breasted can and is provided with means for suspending it from the check-wire $J^2$, and its nozzle should receive the hose J. It is preferably closed at the top, so as to exclude dirt, &c., but should be vented, so that the water will be freely admitted to the full capacity of the can and so the water will also pass out freely.

The bracket L is so made as to permit its ready attachment to the tank or trough and so it may be attached to any ordinary construction of tank.

It will be noticed that the floats $M^3$ are also adjustable on the bar $M^2$, so their power may be increased or diminished, as desired. They are attached to a metal support $M^8$, which is secured to the bar by a set-screw $M^9$, and it will be understood that not only these floats, but the weight $N'$, the pivot-block M, and the set-screw P, must all be adjusted in harmony to secure the necessary tight closing by valve K and the necessary certainty of action by said valve, and in obtaining this harmony of action the screw P may be set so as to render the opening of the valve hard or easy, as needed, and in some cases it may even be set so as to allow the joint between the link and bar $M^2$ to move slightly below the plane in which the pivotal attachment of the link to the valve and the pivot of the bar are located.

I claim—

1. The combination with the mill, the pump, the tank or trough, the water-operated weight, of the connection G and the pipes $F'$ and J united to said connection by separate nipples, substantially as specified.

2. The combination with the tank and its controlling-valve, of the mechanism for operating said valve and the sinker O connected to said mechanism and causing the opening of the valve, said sinker being placed in the tank where it will be uncovered and its gravity increased as the water falls, substantially as specified.

3. The combination with the tank and its controlling-valve, of the mechanism for opening said valve, the sinker O for operating said mechanism in opening the valve, the float or floats for operating said mechanism in closing the valve, and the weight for holding the valve closed, substantially as specified.

4. The combination with the pump, the tank and the regulator of a four-way connection G having a faucet H, and valves R and S, in the branches of said connection leading to the tank and the regulator, substantially as specified.

5. The combination with the metal disk $K^2$ of the rubber disk $K^3$ secured to the metal disk by T-shaped retainer $K^4$ having prongs $K^5$ passing through openings in and clenched upon the rubber, substantially as specified.

6. The combination with the valve K of the swinging bar $M^2$, link $M^4$ connecting the bar to the valve, the weight $N'$, the floats $M^3$ and the sinker O, substantially as specified.

7. The combination with the valve K of the swinging bar $M^2$ connected to the valve at one end, floats at the other end of the bar, the sinker also attached to the bar and adapted to increase in efficiency as it is uncovered by the water, and the closing-weight $N'$, substantially as specified.

8. The combination with valve K and bracket L, of the mechanism for operating said valve consisting of swinging bar $M^2$, link $M^4$, and a support M for the pivot of said bar, the support being adjustable on said bracket, substantially as specified.

9. The combination with valve K and bracket L of swinging bar $M^2$ connected to the valve by a link, a pivotal support for said bar, and means such as the set-screw P and ledge $P'$ for limiting the downward movement of the bar and link, substantially as specified.

10. The combination with a windmill, of means for governing the same in high winds consisting of a regulator adapted to be filled by the mill and acting when filled to throw the mill out of action, and means for limiting the amount of water passing to the service-tank and thereby causing an increased flow to the regulator regardless of the amount of water in the service-tank, whereby the regulator may be set so that it will act repeatedly during high winds, substantially as specified.

11. The combination with the controlling-valve K of the swinging weight and the float and their connections, said weight in one position holding the valve open until the float attains its full power and reverses the weight, and enables it to then assist in closing the valve, substantially as specified.

12. The combination with the controlling-valve K of the tank, of the swinging weight, the float and the sinker, the weight acting in one position to hold the valve closed until overcome by the sinker, and also acting in its other position to hold the valve open until overcome by the floats, substantially as specified.

ERNEST WUERFEL.

Witnesses:
EDW. S. EVARTS,
H. M. MUNDAY.